(12) United States Patent
Boxenhorn

(10) Patent No.: US 7,752,335 B2
(45) Date of Patent: Jul. 6, 2010

(54) NETWORKED COMPUTING USING OBJECTS

(76) Inventor: David Boxenhorn, Moshav Beit Meir, Harei Yehuda (IL) 90865

( * ) Notice: Subject to any disclaimer, the term of this patent is extended or adjusted under 35 U.S.C. 154(b) by 374 days.

(21) Appl. No.: 10/537,429

(22) PCT Filed: Dec. 3, 2003

(86) PCT No.: PCT/IL03/01026

§ 371 (c)(1),
(2), (4) Date: Jun. 2, 2005

(87) PCT Pub. No.: WO2004/051395

PCT Pub. Date: Jun. 17, 2004

(65) Prior Publication Data

US 2006/0075141 A1 Apr. 6, 2006

Related U.S. Application Data

(60) Provisional application No. 60/430,383, filed on Dec. 3, 2002.

(51) Int. Cl.
*G06F 15/16* (2006.01)
*G06F 15/177* (2006.01)
(52) U.S. Cl. .................. 709/246; 709/224; 709/330; 709/203
(58) Field of Classification Search .............. 709/226, 709/225, 224, 221, 203, 246
See application file for complete search history.

(56) References Cited

U.S. PATENT DOCUMENTS

| | | | |
|---|---|---|---|
| 5,768,119 A * | 6/1998 | Havekost et al. ............... 700/4 |
| 6,012,098 A * | 1/2000 | Bayeh et al. ................. 709/246 |
| 6,038,595 A | 3/2000 | Ortony |
| 6,098,116 A * | 8/2000 | Nixon et al. .................... 710/8 |
| 6,195,591 B1 * | 2/2001 | Nixon et al. .................. 700/83 |
| 6,473,794 B1 * | 10/2002 | Guheen et al. .............. 709/223 |
| 6,643,652 B2 * | 11/2003 | Helgeson et al. .............. 707/10 |
| 6,650,761 B1 | 11/2003 | Rodriguez et al. |
| 6,704,723 B1 * | 3/2004 | Alavi et al. .................... 707/3 |
| 6,822,663 B2 * | 11/2004 | Wang et al. ................. 715/854 |
| 6,839,070 B2 * | 1/2005 | Meandzija et al. .......... 715/736 |
| 6,938,070 B2 * | 8/2005 | Esposito ..................... 709/205 |
| 7,152,018 B2 * | 12/2006 | Wicks ........................ 702/186 |
| 7,181,462 B2 * | 2/2007 | Shalabi et al. .............. 707/102 |
| 7,194,480 B2 * | 3/2007 | Shalabi et al. .......... 707/103 R |
| 7,392,169 B2 * | 6/2008 | Gabele et al. ................. 703/13 |
| 7,424,530 B2 * | 9/2008 | Chagoly et al. ............. 709/224 |
| 2002/0073236 A1 * | 6/2002 | Helgeson et al. ........... 709/246 |
| 2003/0061317 A1 * | 3/2003 | Brown et al. ................ 709/221 |
| 2003/0069922 A1 * | 4/2003 | Arunachalam .............. 709/203 |

FOREIGN PATENT DOCUMENTS

| | | |
|---|---|---|
| GB | 2411994 | 9/2005 |
| WO | WO 00/63781 | 10/2000 |
| WO | WO 01/52502 | 7/2001 |

* cited by examiner

*Primary Examiner*—Tilahun Gesesse

(57) ABSTRACT

A system for networked computing using objects, each object comprising: enablement data, a first identity arrangement for holding a first identity indicating a host or provider (22) of said object (26), and a second identity arrangement for holding a second identity of a remote entity (client 10) establishing a relationship with said object via a network (12). Such a system supports network based computing and interactions between remote objects, including desktop-like behavior in which such remote objects are represented by desktop-like icons on a user terminal device.

31 Claims, 9 Drawing Sheets though Web Services do not have a user interface, the problems of multi-entity transactions are essentially the same as in the World Wide Web—how do you turn multiple two-party transactions into a single multi-party transaction that better represents the task at hand?

NETWORKED COMPUTING USING OBJECTS

RELATED PATENT APPLICATION

This application is a National Phase Application of PCT/IL03/01026 having International Filing Date of 3 Dec. 2003, which claims the benefit of U.S. Provisional Patent Application No. 60/430,383 filed 3 Dec. 2002.

FIELD AND BACKGROUND OF THE INVENTION

The present invention relates to networked computing using objects and, more particularly, but not exclusively to a method, system and apparatus for permitting interactivity between at least two objects over a network. The invention is applicable to the Internet and to the World Wide Web.

The World Wide Web is the first, and currently the only mass-appeal user interface to the Internet. Technically, the World Wide Web consists of two standardized parts: the server and the browser, which together enable service providers to create web sites that can be accessed by a remote user via a browser. Conceptually, the World Wide Web creates a powerful user interface paradigm, which is often called the Storefront Model. In this model, a service provider's web site can be thought of as a store's storefront, and visiting a web site is like visiting a store. Using a browser to visit one site after another, even in the case when this is done by following links, is like going from one store to another, i.e. the user goes into a store, the user leaves the store, the user goes into another store, the user leaves the store, etc.

While powerful, the World Wide Web's storefront paradigm makes it very difficult to involve more than one entity in any interaction. The case of e-money and Internet-based shopping in general illustrates this problem. Many attempts at e-money have been tried, and the need for e-money is clearly defined and widely agreed upon. But no e-money solution has succeeded in achieving general use. Instead, Internet users are reduced to giving out their credit card numbers over the Web. Consider the following scenario:
1. A user buys a book from an on-line bookstore.
2. The bookstore sends the user a bill.
3. The user pays the bill from his on-line bank account.
4. The bookstore sends the user the book.

This is the dream that e-money is supposed to fulfill. Notice that this transaction involves at least two entities, in addition to the user: the bookstore and the bank. How can they be integrated? Currently, the only solution is for the bookstore and the bank to integrate a third-party e-money solution into the back end of each web site. This kind of integration requires the service providers—the bookstore and the bank—to expend resources to do the integration. Doing so will generally preclude any competing integration (such as other e-money services), and will be useless if one party does the integration and not the other. When brought into the real world, in which there are a very large number of merchants and a very large number of banks, the odds of the integration being cost effective are very low.

In general, the user would like to be able to integrate any of his on-line relationships with any other. With respect to e-money, he would like to be able to pay for any on-line service from his on-line bank account—presumably provided by his usual bricks-and-mortar bank.

In addition to providing a user interface paradigm, Internet and World Wide Web technology is beginning to be applied to inter-application communication, a field generally known as Web Services. Though Web Services do not have a user interface, the problems of multi-entity transactions are essentially the same as in the World Wide Web—how do you turn multiple two-party transactions into a single multi-party transaction that better represents the task at hand?

There is thus a widely recognized need for, and it would be highly advantageous to have, a networked computing system devoid of the above limitations.

SUMMARY OF THE INVENTION

According to one aspect of the present invention there is provided an object comprising:
enablement data,
a first identity arrangement for holding a first identity indicating a host or provider of the object, and
a second identity arrangement for holding a second identity of a remote entity establishing a relationship with the object via a network.

Preferably, the object is accessible to the remote entity via the enablement data.

Preferably, the enablement data further comprises at least one of a link, attributes, a class identity and behavior.

The object may comprise a user interface via which a user at the remote entity is able to carry out interactions therewith.

Preferably, the user interface is configurable to permit interactions with other objects.

The object may be configured as an interface object to communicate between the remote user and another object, the interface object comprising:
a translating unit for translating messages between an external messaging protocol and an internal system protocol, and
a communication unit for relaying messages between the remote entity and another object via the translating unit.

Preferably, the translating unit is operable to relay messages between a plurality of other objects and the remote entity.

The object may comprise selectable interface functionality, each suitable for a different user terminal device.

Preferably, the enablement data further comprises at least one attribute and wherein the predetermined object behaviors allow altering of the at least one attribute.

The object may be configured to generate messages in response to user interactions at the remote entity and to send the messages to the another object.

The messages may comprise any of HTTP messages, WAP messages, XML messages, SOAP messages and WSML messages.

Preferably, the messages are specific responses to any one of a group of computer—user interactions comprising: a key press, a mouse click, a mouse drag, a mouse select, a mouse drag and drop, a cut action, a copy action, a paste action, a launch action, an undo action, a redo action, a repeat action, and a delete action.

The object may comprise a list, associated with a data item or event, comprising at least one object that has indicated a need to be updated regarding the data item or event, and
a publish module associated with the list for sending messages regarding data item or event to the at least one object.

Preferably, the list module is programmable, to allow a user at the remote entity to alter the list.

The object may comprise a plurality of data items or events, and wherein the list module is configured to provide separate lists for different ones of the data items or events.

Preferably, the user interactions comprise interactions comprising associations with other objects, the associations being made at the remote entity.

The object may be configured such that the interactions at the remote entity generate commands that include identification data of a respective one of the other objects.

The object ID, together with the first and the second Ids mentioned above, preferably provides a unique identity thereto.

According to a second aspect of the present invention there is provided an interfacing system for activation, at a host, by a remote entity, of at least one first object comprising:

enablement data, a first identity arrangement for holding a first identity indicating a host or provider of the object, and a second identity arrangement for holding a second identity of a remote entity establishing a relationship with the object via a network, the interfacing system comprising an interfacing object located on the host having a message relaying capability for relaying messages between the remote entity and the first object to enable user control by the remote entity over the first object.

Preferably, the first object is remotely located from the host.

The interfacing system may comprise a desktop object located between the interfacing object and the first object, the desktop object being configured to represent the first object as a desktop icon and to provide desktop icon functionality to the remote entity.

According to a third aspect of the present invention there is provided a hosting server for providing computing services via a network to a plurality of remote users, the hosting server comprising:

a network interface for interaction with remote users over the network;

at least one interfacing object comprising enablement data, a first identity arrangement for holding a first identity indicating a host or provider of the object, and a second identity arrangement for holding a second identity of a remote entity establishing a relationship with the object via a network the interfacing object being able to send user interface messaging to a respective remote user via the network, and to interpret user interactions of the respective remote user for messaging to further remotely located objects.

According to a fourth aspect of the present invention there is provided a hosting server for providing computing services over a network to a plurality of remote users, the hosting server comprising:

a network interface for interaction with remote users over the network; and at least one object, the object comprising:

enablement data, a first identity arrangement for holding a first identity indicating a host or provider of the object, and a second identity arrangement for holding a second identity of a remote entity establishing a relationship with the object via a network.

According to a fifth aspect of the present invention there is provided a method of hosting network computing services comprising:

a) packaging into an object:

enablement data, a first identity arrangement for holding a first identity indicating a host or provider of the object, and a second identity arrangement for holding a second identity of a remote entity establishing a relationship with the object via a network; and b) receiving a request from a respective remote entity over a network relating to the object and setting the second identity to identify the respective remote entity.

The method may comprise:

creating an interface object, the interface object being responsive at least to standard user interaction events, and receiving interaction messaging from the remote entity at the interface object and using the interaction messaging to activate the at least one behavior.

The method may comprise using the second identity for personalization of the object for the remote entity.

The method may comprise using respective second identities to define an aggregation of personalized objects as a workspace environment for the remote entity.

According to a sixth aspect of the present invention there is provided a system for interworking over a network, comprising a plurality of objects located on the network, each object comprising:

enablement data, a first identity arrangement for holding a first identity indicating a host or provider of the object, and a second identity arrangement for holding a second identity of a remote entity establishing a relationship with the object via the network.

Preferably, more than one of the plurality of objects holds in common at least one of the first and the second identity.

Preferably, each of the objects further comprises an object ID, the object ID being selected such that a combination, for the object, of the first ID, the second ID and the object ID is unique within the system.

One or more objects may be described by a class which is local to a host on which the object resides.

The class may support one or more services comprising object definitions. Preferably the services are global to the whole system.

The system may comprise authentication hosting for respective remote users, such that each remote user has an assigned authentication host for the system.

According to a seventh aspect of the present invention there is provided a computer-readable medium having computer executable instructions for providing interworking over a computerized network, the interworking comprising:

a plurality of objects located on the network, each object comprising:

enablement data, a first identity arrangement for holding a first identity indicating a host or provider of the object, and a second identity arrangement for holding a second identity of a remote entity establishing a relationship with the object via the network.

Unless otherwise defined, all technical and scientific terms used herein have the same meaning as commonly understood by one of ordinary skill in the art to which this invention belongs. The materials, methods, and examples provided herein are illustrative only and not intended to be limiting.

Implementation of the method and system of the present invention involves performing or completing certain selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings.

DESCRIPTION OF THE PREFERRED EMBODIMENTS

Figure 1:
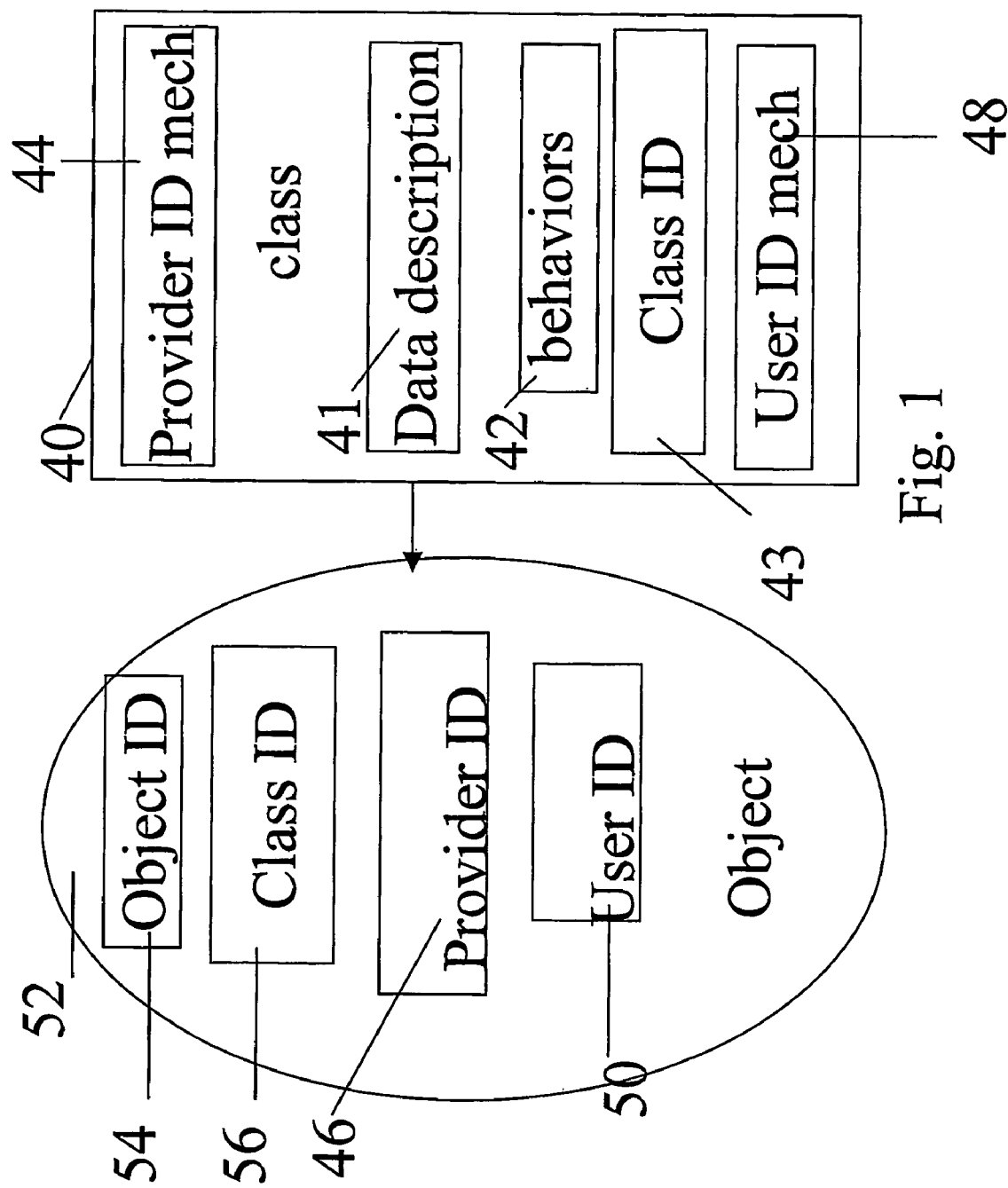
FIG. 1 is a simplified block diagram showing an object class and a corresponding object, according to a preferred embodiment of the present invention.

The present embodiments provide a user interface paradigm, and the technology to implement it. The paradigm enables a human user to create, understand, and manage transactions involving multiple entities, typically remote entities via the Internet. The paradigm involves classes located on hosts, which classes are used to create objects on a server following a request from another object, which request may or may not originate indirectly from a user. As will be explained in greater detail below, an object is specific to a user, and has a defined interface for interacting with other objects that allows access to any one of a plurality of behaviors of the object. An object known as a user interface, or U/I, object, through which a human user on a terminal device (such as a browser) interacts with other objects, translates between an external message format, determined by the user terminal device, and the internal message format. The U/I object thus relays messages in either direction between a specific object and the user terminal device.

The paradigm allows the user to have a plurality of icons, representing objects from different servers, displayed on his desktop and to carry out interactions between them. Thus a drag from a first object to a second object appears the same as a drag between two icons on the conventional computer desktop, except that the resulting event messages are sent to each of the objects involved on their respective remote servers. The message sent to each object may indicate details of the other remote object or objects or any other details needed to allow the objects to interact. Furthermore, the interaction occurs on one or the other or both of the remote servers. Provided the objects know how to interpret the messages, the desired interaction will occur.

As a result, the user is provided with a desktop-like paradigm for Internet or other network operation, as opposed to the current storefront paradigm, in which the user visits one web site at a time, without any ability to integrate more than one in a single transaction. The Internet items of current interest appear as one or more interactive items on a user's desktop and can be integrated using desktop metaphors such as drag and drop, cut and paste, or double-click.

As well as providing a different model for the Internet, the paradigm also enables the vision of remote computing in which computing is carried out on servers and in which the local terminal is only required to have general user interface capabilities. The user terminal can therefore be any kind of network enabled device.

The principles and operation of a networked computing system according to the present invention may be better understood with reference to the drawings and accompanying description.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

Reference is now made to FIG. 1, which is a schematic diagram illustrating a software object and its originating class, modified for use in the preferred embodiments of the present invention. Class 40 is a standard software class typically comprising at least some of data descriptions 41 and behaviors 42, and a class identity 43. The class is modified for the purposes of the present embodiments in that it additionally has a host or provider ID mechanism 44 which allows any object created therefrom to create and store within itself an identity of the host of the object, thus corresponding host ID 46, in any object created of the class. The class also has a workspace or user ID mechanism 48 which allows any object created therefrom to create and store within itself an identity of a user owning the object, thus user ID 50 in the resulting object 52. Hereinafter the terms "user ID" and "workspace ID" are used synonymously.

As will be discussed in respect of FIG. 3, object 52 is created in response to an "add object" message being sent to the originating class. The message is typically from another object, and may be automatic or may originate directly or indirectly from a remotely located user entity. As will be explained in greater detail below, the remotely located user entity is not necessarily the user owning the object who is identified in user ID 50.

The object 52 may additionally comprise a class ID 56 which is passed on from the originating class 40 and an object ID 54, which identifies the specific object in combination with the user ID 50, and the host ID 46. In common with other software objects, object 52 comprises at least one of data, behavior and links to other objects.

Figure 2:
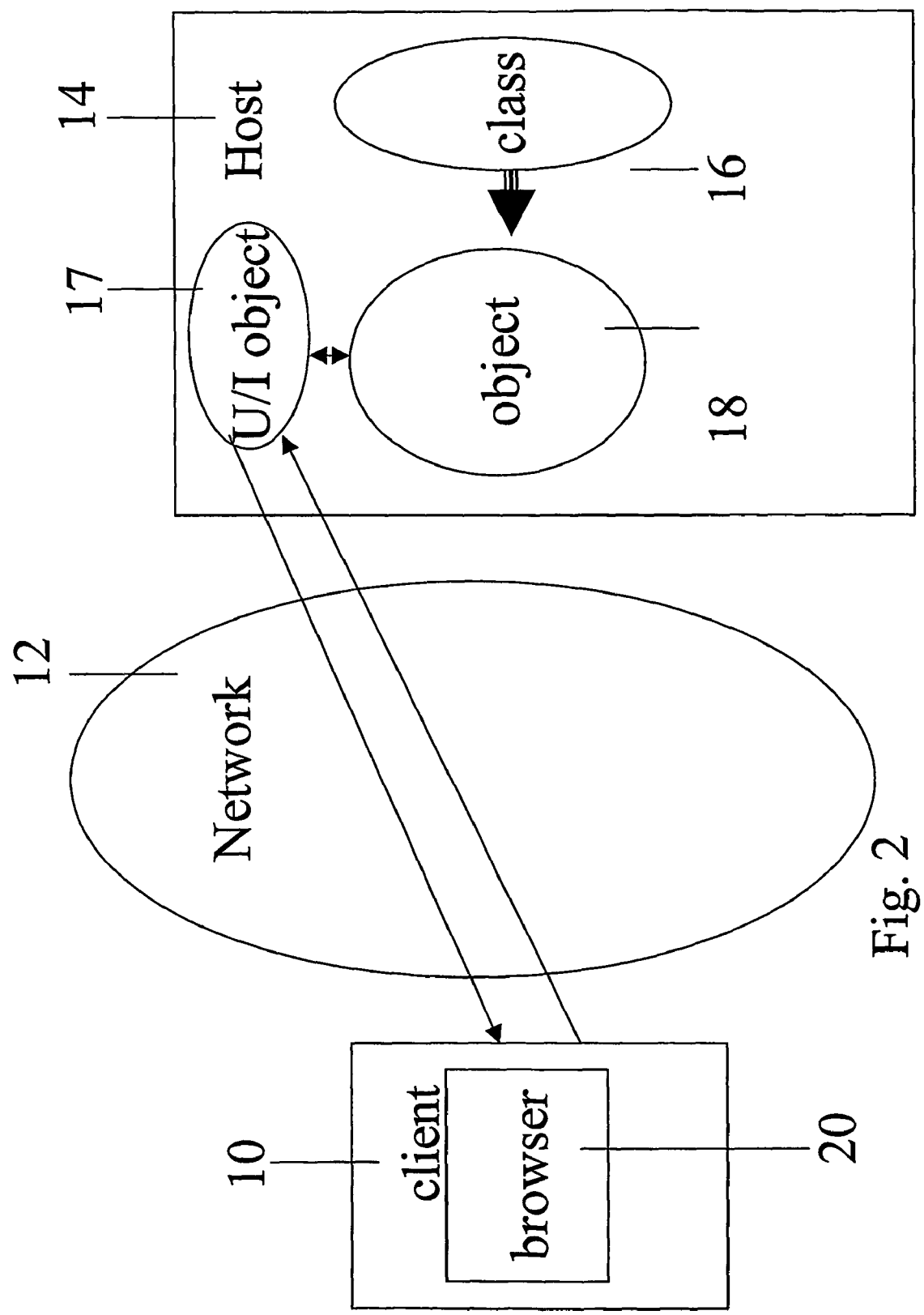
FIG. 2 is a simplified block diagram showing a remote user interacting with a single object via an interface object, according to a preferred embodiment of the present invention.

It is noted that the security mechanisms for communications can be as strong or as weak as required. Thus when class 40 is an electronic money class, the communication mechanisms preferably make use of exchanges of electronic signatures. When class 40 is a news item that it is intended to make freely available over the Internet then the communication mechanisms may make use of simple messages. Furthermore whilst certain objects may restrict use to single user-owners identified in the user ID 50, other objects may allow multiple users. Yet other objects may allow certain users to have different levels of rights so that for example certain users can modify the object's data whilst other users may merely view the object Reference is now made to FIG. 2, which illustrates in simplified terms a networked computing system according to an embodiment of the present invention. In FIG. 2 a user terminal 10 is connected remotely over a network 12, typically the Internet or variations thereof, to a host 14 which belongs to a particular provider. Host 14 hosts a class 16, and class 16 provides mechanisms for creating corresponding objects, and object 18 is derived in this sense from class 16. Object 18 thus has the identity structure explained in FIG. 1. The location of object 18 on host 14 may have been determined by the user in a number of ways, for example in a search, or it may have been pointed to by a previous object that the user looked at or it may have been reached through a list of favorites or in any other way. The user, or more typically an object he is using at the time, requests the object's user interface by sending a "get UI" message, see table 1 below, and then the user is able to interact with object 18 via user interface object 17.

For interaction messages in general which originate with a user, the message goes via user interface or U/I object 17 which is located on host 14. The user interface object, as will be explained in greater detail below, relays messages between a remote entity such as a user and the object of interest. The user interface object continues to provide a channel through which the user can interact with the objects as long as the user is interacting directly with the object via its user interface. The user interface object preferably shares the structural characteristics discussed above in respect of FIG. 1, and its functionality is to receive messages from either the remote entity or the objects of interest, translate between HTTP or whatever protocol the user's end device may be using, and the internal system protocol used to communicate between objects, and then relay the message.

When a user interacts directly with an object's user interface via the U/I object, a session ID is sent with every message, enabling the U/I object to determine the user ID of the user currently interacting with the object, such user ID may be the same or different from the user ID of the object being interacted with. The session ID is created when the user logs into the system via his identifying host. The object's user interface is created by the object according to the requirements of the user's terminal device, as indicated by the U/I object. For example, if the terminal device is a browser, the user interface is a web page (HTML document). The web page can display additional information about other objects, as icons, or by any other means, or generate additional interaction with the same object, or with different objects, as required for its user interface needs. In all cases the session ID can be passed on to other objects accessed as part of the same session, in order to give the user access rights to functionality permitted to him by the objects being accessed.

The object may also access other objects directly, as a result of a user action, or for some other reason such as the time of day, or a change in stock price. When an object accesses another object, the U/I object is not involved. The object sends another object a message directly, in the internal message format. In all cases, context information is passed on, containing the user ID of the user who originated the session, the session ID, and all intermediary host IDs, user IDs, and object IDs, of all objects between the originator of the session and the receiving object. Such information lets the receiving object know any information necessary to determine access rights, as well as to which session the current message belongs.

At the browser 20, the user simply carries out the usual interactions with browser 20, such as mouse clicks, drag and drop, key presses and the like on a standard computing device, and their equivalents on other digital devices such as PDAs, mobile telephones and the like. The browser 20 translates the interactions into messages in HTTP or any other suitable code and the messages are then sent over network 12 to the host 14 carrying interface object 17. Interface object 17 translates the code into the internal message format, e.g. using XML, and sends the message to object 18. Object 18 relates the incoming messages to the behaviors of the underlying class 16 and carries out actions as necessary. If the origin of the message is another object, then the message is already in the internal message format and thus communication is directly between the objects, no interfacing being necessary.

Figure 3:
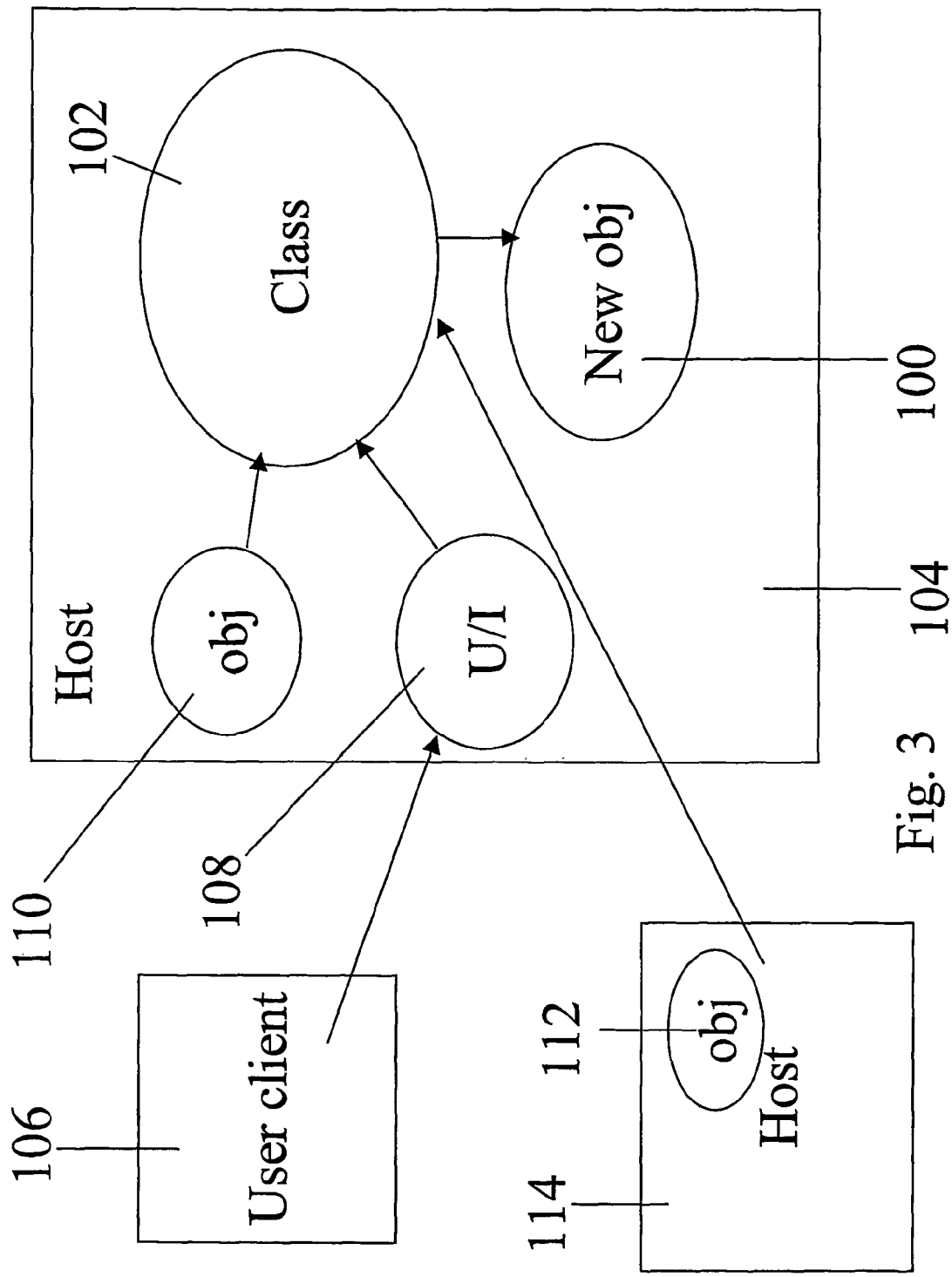
FIG. 3 is a simplified diagram illustrating three different routes for creating a new object.

Reference is now made to FIG. 3, which is a simplified diagram illustrating three different ways in which an object 100 may be created from a class 102 on a host 104. In a first way, a user client 106 makes a request that requires an object to be created. The request is sent via U/I object 108 and reaches class 102 as an "add object" message. See Table 1 below for an exemplary list of system messages. A second way is that an object 110 located on the same host 102 issues an add object message. A third way is that an object 112 located on a remote host 114 issues an add object message. Whichever of the three ways is used, new object 100 is created from class 102. Typically although not necessarily, in the first way the user client becomes the owner of the object in that the object belongs in his workspace and has a corresponding user ID. In the other two cases, the object responsible for sending out the add object message determines the owner of the object.

Regarding users of the object, the object may be used by a user-owner, or by a third party user who is not an owner. More particularly a distinction is made between, on the one hand, the owner of an object, in the sense that the object belongs to his workspace and his user ID is used as the object's user ID alternatively referred to as the object's workspace ID, and on the other hand, a third party who is able to interact with the object. Whilst the third party is also a user, the object is not in his workspace and his identity does not form a part of the object. In other words, a user can access both his own objects, and other user's objects (given access rights). A user can be either, person, a group, an application, an entity or anything that has a user ID.

Generally, objects do not send messages for no reason, and any message either originates from a user client or belongs to a series of messages that originates with a user client. All messages in that series form a session belonging to the originating user client and the session provides the basis for a security feature available with the present embodiments, namely that originating users are substantially traceable.

Figure 4:
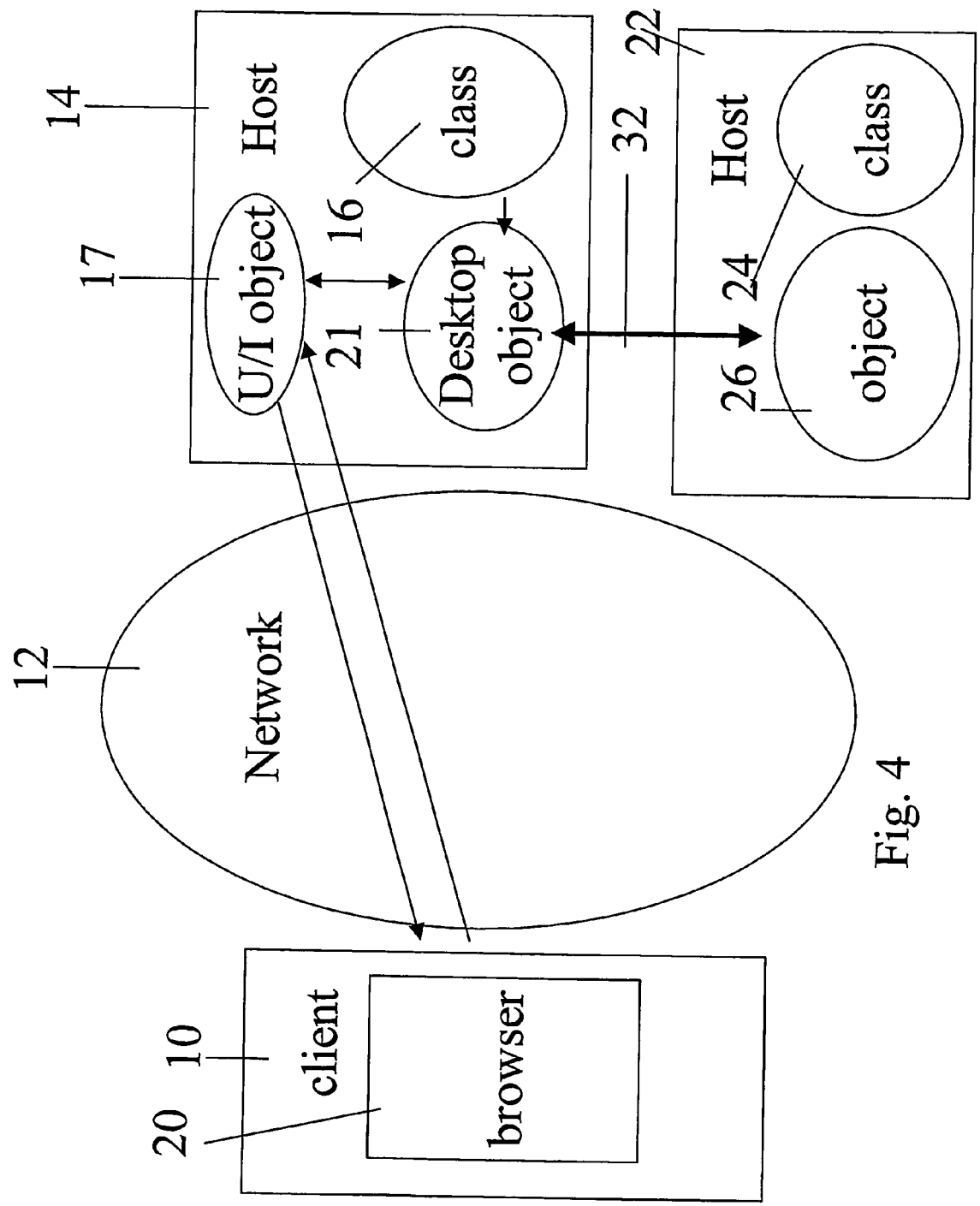
FIG. 4 is a simplified block diagram illustrating a remote user interacting with one or more objects via an interface object and a desktop object.

Reference is now made to FIG. 4, which is a simplified diagram illustrating the embodiment of FIG. 1 with a desktop object to provide the user with desktop functionality for interaction between objects. Parts that are the same as in previous figures are given the same reference numerals and are not referred to again except as necessary for understanding the present embodiment. Object 21 is a desktop object, that is an object which provides facilities similar to a desktop on a local computer, namely it allows one or more objects to be represented by icons on a background, and provides certain types of interactions between the icons through interfacing actions such as drag and drop, left click, double click, and right click and through the use of menus. The icons can be manipulated, through the desktop, to activate the underlying objects in various ways. User terminal 10 is connected remotely over network 12 as before and connects via interface object 17 to desktop object 21. Desktop object 21 in turn communicates with a second object 26 on host 22, which is of interest to the user of the remote terminal. Object 26 may have been located by the user in a search or it may have been pointed to by a previous object that the user looked at or it may have been reached through a list of favorites or the like. Object 26 is represented by an icon in the web page generated by desktop object 21, which the desktop object sends to browser 20. The interface appears as a browser window at the user's computer and shows the icon representing object 26. The user can interact with the icon in the same way as with any standard desktop icon. For example, a right click may open a menu, or a double click may open a new window which is a direct interface to the object.

It is pointed out that the desktop function is a typical application of an object of the kind described in respect to FIG. 1.

Figure 5A:
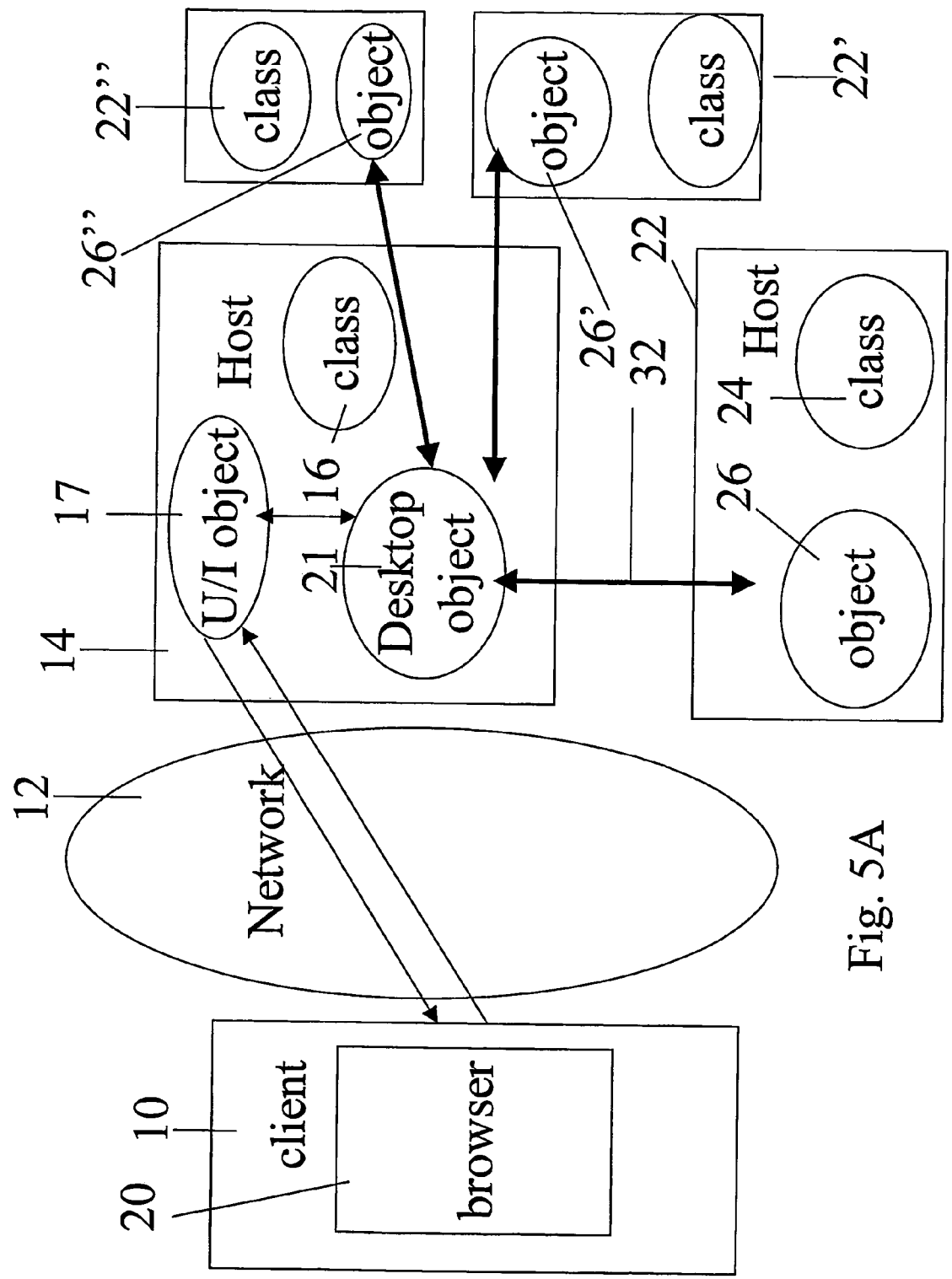
FIG. 5A is a simplified block diagram illustrating a desktop object as shown in FIG. 4, presenting several objects to the user as icons.

Reference is now made to FIG. 5A, which illustrates a plurality of objects, 26, 26' and 26", all accessed by a single desktop object. Each of the objects is represented by a separate icon on the desktop and can be interacted with separately from the other objects. In addition, multiparty interactions between multiple objects are possible, such as dragging one icon and dropping it on another, as will be explained in greater detail below. The user thus has the ability to see multiple objects as icons on a desktop. The desktop type environment provides a certain amount of interactivity between compatible icons and windows in the same way that a standard desktop provides interactivity between compatible icons. Each object, by means of its icon or window, is capable of receiving, interpreting and sending relevant user-interface interactions. Now, in conventional World Wide Web computing it is common for a single user to have two or more web pages from different sites open as separate windows in his browser. However there is no possibility of bringing about any interaction between the two windows. Rather, any interaction between the two sites has to be predefined by integration within at least one of the sites. By contrast, in the embodiment of FIG. 4, standard user interactions on the desktop are interpreted and are as effective between the two objects on different web sites (hosts) as if they were objects on the same web site, with no previous integration necessary. It is noted that, with state of the art web page based systems, even on the same web site, such functionality is hard to obtain and thus is almost never implemented.

By contrast with the conventional system, two remotely located objects that are being displayed in a common desktop according to the present embodiments are able to interpret user interactions as interactions involving at the other object. For example a "drag and drop" interaction, in which one object is selected and dragged to the other object, is an interaction having an originating object and a target object. In the event of such a drag and drop interaction between two icons, the desktop functionality ensures that programs involved in a drag and drop interaction are informed as to whether they are the originating or the target object and they are informed of the identity of the other object. The browser translates the drag and drop information applied to its icons into an HTTP or like message. The message may for example identify the type of interaction, the part played by the object in the interaction, viz origin or target, and the identity of the other object. The message may include a way of identifying host 14 on which the corresponding interface object 17 is located, and an identification of the user's specific desktop object 21. The desktop object then communicates as necessary with further objects such as object 26. At object 26 the behaviors of class 24 provide a response to particular interactions. Arrow 32 indicates an exchange of data, typically via XML messaging, that tells desktop object 21 what to do based on object 26's behavior. Exchange of data 32 preferably uses the identity of object 21 and host 14 as typically included in the XML message.

Figure 5B:
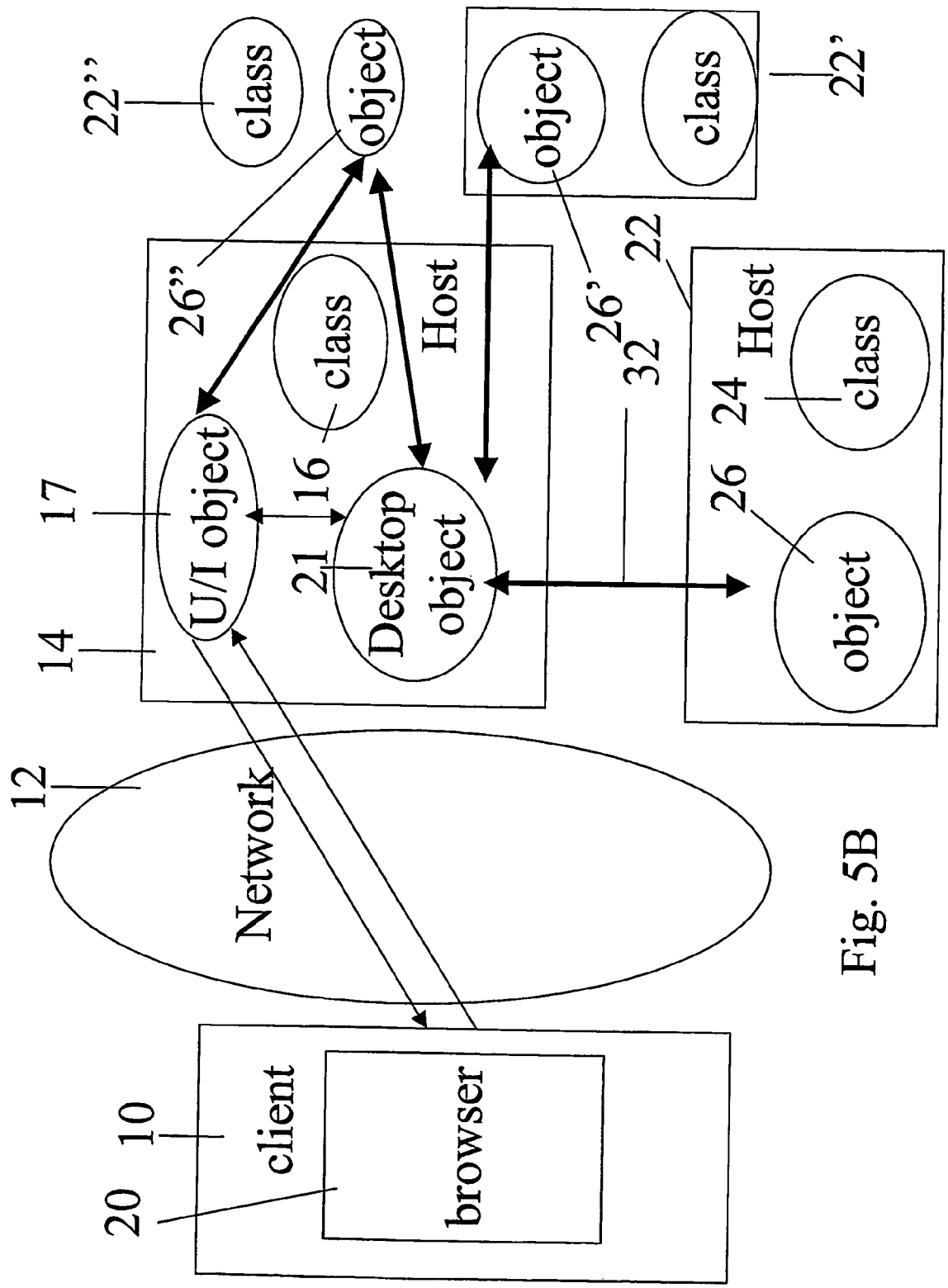
FIG. 5B is a simplified diagram illustrating one of the objects in FIG. 5A being accessed by the user directly via its own interface, while still appearing as an icon on the desktop object's interface.

One of the interactions that the desktop supports is to open a direct interface to an object. Thus a left click or a double click on a word processor icon may open a direct window to the word processor. Reference is now made to FIG. 5B, which illustrates what happens when a user double clicks on object 26" and opens a direct interface. In response, the web page generated by desktop object 21 opens a new browser window which sends object 26" a "get UI" message via U/I object 17, asking for a new session ID to be generated for the new interaction. The object 26" sends interface data directly to interface object 17 rather than communicating via the desktop object 21. All objects continue to be displayed by the desktop object, and can be interacted with. The result is that the user receives a window which is a direct interaction with the object 26", whilst at the same time the original desktop window underlies the new object window. The effect is similar to having an active program window open over a desktop on a conventional computer.

Desktop object 21 may for example display two icons, a word processor or a spreadsheet as one icon and a compatible data file as a separate icon. Dragging and dropping on the user's desktop opens the document within the spreadsheet or word processing program, enabling the user to edit the document. The user is able to open the document on a word processor or the like without at any time downloading the document or the word processor program. Instead the data exchange enabling the document to be opened on the word processor occurs between the two hosts on which the document and the word processor are respectively located. The user interacts by pressing a key on a keypad and the response of the object is to add a corresponding letter to a corresponding position in the current document. Echoing of the added letter to the user screen may be carried out locally or may be carried out by the object as most convenient in the circumstances. The message sent by the browser and relayed by the interface object may simply indicate the key that was pressed and the location of the cursor at the time. Creating a new session for the new interaction enables the user to edit many documents with the same word processor at the same time.

It will be appreciated that the success or failure of the interaction depends on whether the object has a behavior associated with the interaction and whether the behavior is meaningful to the other object. Thus if an attempted interaction between two objects located on a conventional desktop would not be likely to work then the present embodiments are not going to make that interaction any more likely.

Figure 6:
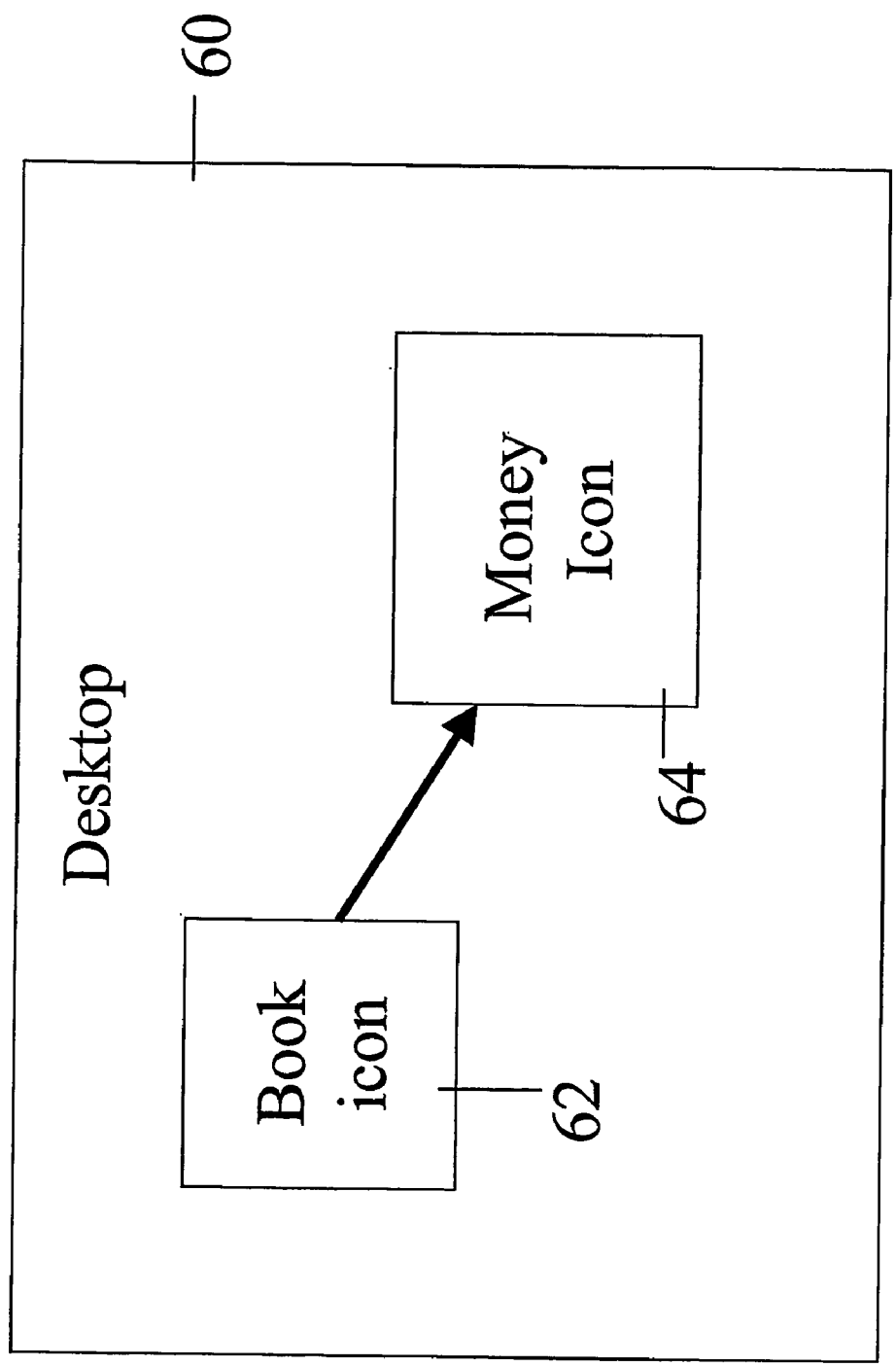
FIG. 6 is a simplified diagram showing a desktop-type interaction between two remote objects according to a preferred embodiment of the present invention.

Reference is now made to FIG. 6, which is a simplified diagram illustrating a browser window at the user client. The browser window shows a desktop 60 displaying two icons representing two objects gathered from separate hosts. The first icon 62 is a book icon indicating a book available for sale. The book icon may support a number of interactions, for example an interaction to obtain information about the content of the book, another interaction to find out about purchase information and another interaction to enable buying of the book. The object typically originates from an online bookstore.

The second icon 64 is a money icon, representing an object that originates from an online bank and which represents the user's account at that bank. The money object has no special connection to the online bookstore.

The user decides he wishes to purchase the book and so he drags the book to the money object or vice versa. The interface of the money object obtains the details of the type of interaction, for example drag or drop, as well as the details of the other object involved and sends the details to the money object on the respective originating host, as specified by its identities. The interaction is interpreted as a request to purchase, and a transaction is carried out between the bank and the online bookstore as a result of which the price of the object is determined by the bank, the user is debited for the sum, the bookstore is credited and the bookstore is instructed to package the book and send it to the user. The crediting preferably creates a receipt object in the user's workspace on the bookstore's host, to confirm the transaction, while the debiting creates a debit object in the user's workspace on the bank's host. The interaction typically includes the user being required to confirm the purchase, and secure identification is typically carried out, as mentioned above. The user can then view both the receipt object and the debit object in his workspace via the desktop object, and carry out further interactions using them.

Furthermore, the bookstore may not have an account at the user's bank, in which case a further interaction may be required between the user's bank and the bookstore's bank. The further transaction is easily added in the present embodiments by incorporating into the bookstore object's behavior. That is to say the bookstore's book object recognizes a purchase interaction and the purchase interaction launches the bookstore's own money object which allows processing directly with the host of the bookstore's bank.

Figure 7:
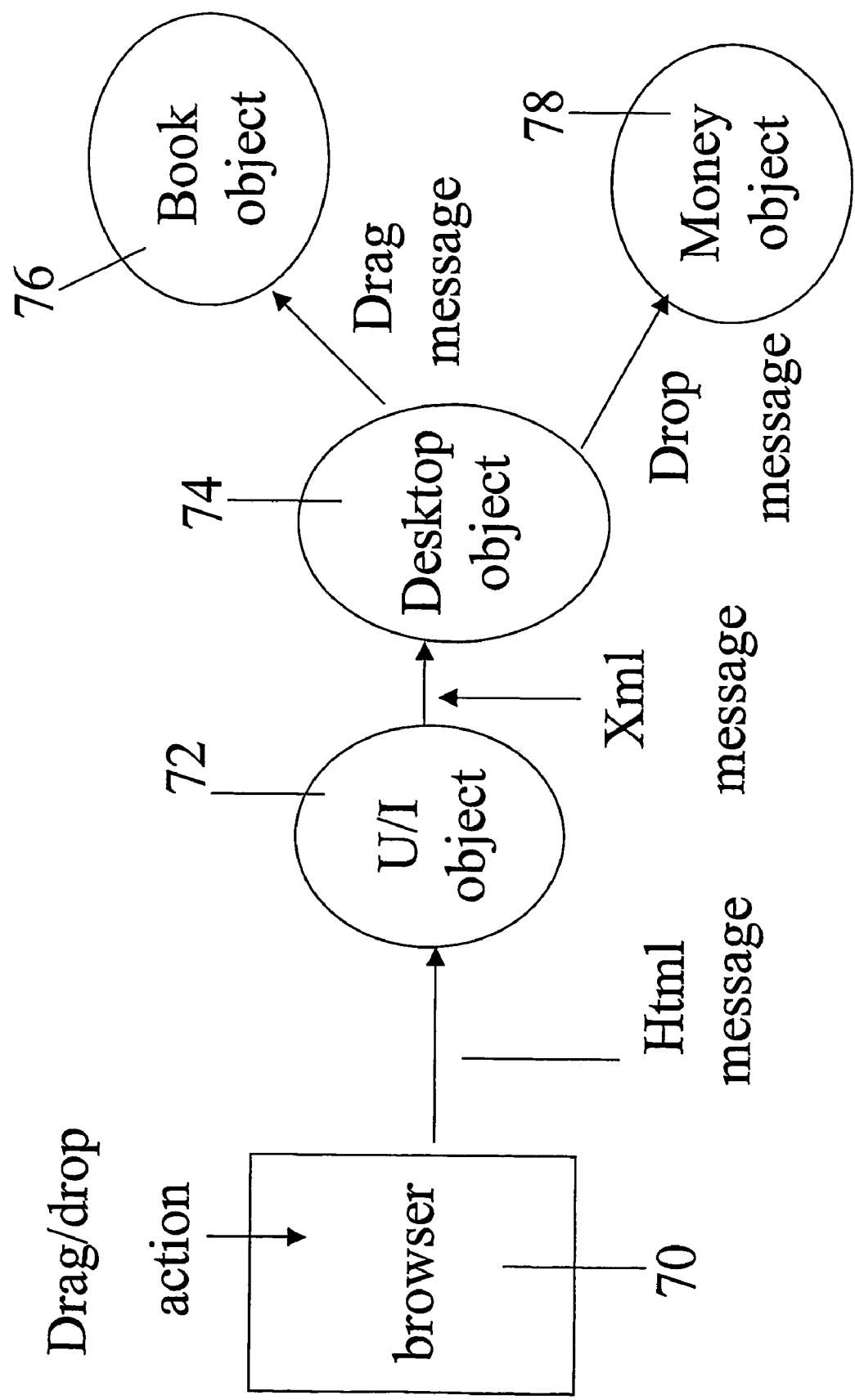
FIG. 7 is a simplified diagram illustrating messaging over the network to support the interaction of FIG. 6.

Reference is now made to FIG. 7, which is a simplified schematic diagram illustrating message flow during the drag and drop operation described in FIG. 6. The drag and drop action occurs within a desktop window of browser 70 and produces HTTP messages which are sent over the network to interface object 72. It will be appreciated that HTTP is the message format typically used by browsers and that if the device used is not a browser then the message will be sent in whatever format is most suitable, for example a mobile telephone may use a WAP format as the message format. The interface object 72 translates the HTML or other network format messages into an internal messaging format. Convenient formats for an internal messaging format include XML, or subsets of XML such as SOAP, but may include any other suitable format. The internal format messages are sent on to desktop object 74. Desktop object supports the desktop window that the user sees and knows how to support icons and desktop operations such as drag and drop. The desktop object interprets the drag and drop operations in terms of the icons it is currently supporting. It is able to process the commands within terms of the desktop and to send appropriate messages to the objects represented by the icons. In the present case a drag message is sent to book object 76 to say it is being dragged to money object 78. At the same time a drop message is sent to money object 78 to say that book object 76 is being dropped on it. The book object has behavior for dealing with money objects and the money object has behavior for dealing with any kind of purchasable product. The money object does not necessarily know what the book object is at the time the book object is dropped on it but it may determine whether the book object has any compatible behaviors or not, typically by ascertaining which services it supports. Following the drag and drop operations the two objects exchange information as necessary so as to enable the transaction. The book object informs the money object that it is a purchasable object having a given price and an account at a given bank. The money object knows, from the user ID of the session and its own user identity 50, which, for security purposes, the bank would typically require that they be the same in cases such as this, who the potential purchaser is. The money object is associated with the purchaser's account which it represents, and the money object arranges to debit the account of the purchaser, credit the seller, and inform the parties so that the transaction may take place.

It is noted that in the above example the network protocol used was HTTP and the internal protocol used between the servers was XML-based. However the invention may use any suitable protocol for either stage. For example if the user's terminal device is a mobile telephone then, as mentioned the message from the terminal device to the U/I object may use WAP or a like protocol. Preferably, the U/I object is able to identify the terminal device type and select an appropriate message format.

Figure 8:
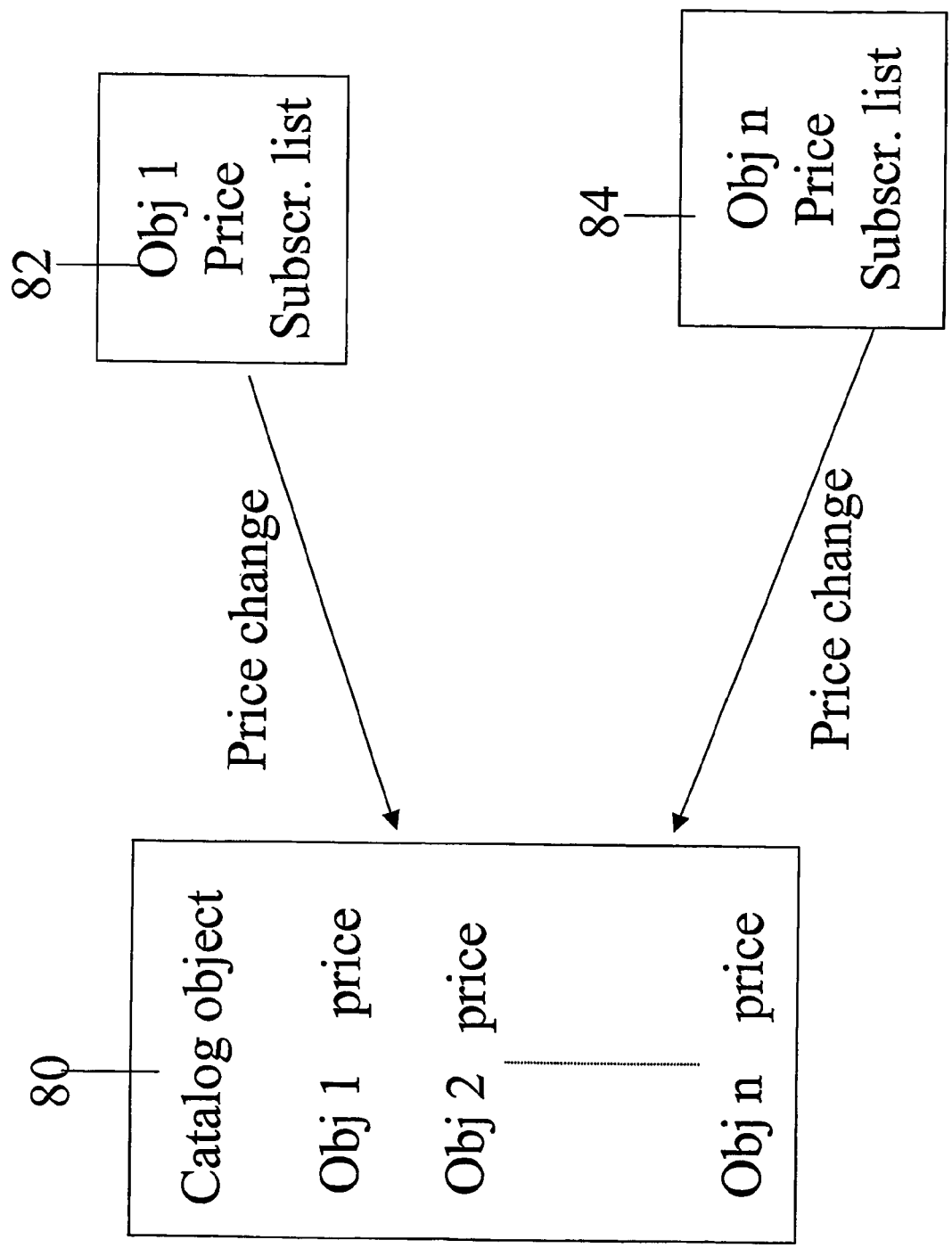
FIG. 8 illustrates an object according to the present invention using a subscribe-and-publish procedure to keep updated regarding changes at other remotely located objects.

In the above example the money object does not know the price of the book object and part of the transaction involves the two objects communicating the price data between them. However a user may choose to create a catalog object, say using a spreadsheet, the catalog being intended to contain updated information of other objects available over the network. For example, a car manufacturer may source parts from a number of different providers. He may set up his spreadsheet to deal with equivalents of a given part by regularly checking up on objects representing the given part from each of the providers, but to actually display the products in order of current price, so that the cheaper part appears first. However, the prices may change with an uncertain frequency and the manufacturer wishes to have updated prices at all times. Reference is now made to FIG. 6, which illustrates a way in which such a service may be provided, that is by what is known as a subscribe-and-publish list held by the object at which the data can change. In FIG. 8, catalog object 80, which may be a spreadsheet or the like, keeps data on objects 1 . . . n, including remotely located objects 82 and 84. As a new object is added to the catalog, the catalog object sends a subscription message to the newly added object. The newly added object maintains one or more subscribe-and-publish lists corresponding to data items or events in the object. The object responds to the subscription message by adding the catalog object to the subscription list. Subsequently, when the data item is changed, the object informs each object on the subscription list for the respective data item, including the catalog object. Thus the catalog object automatically obtains the latest prices.

In general, updating or otherwise contacting additional objects can be provided via the above-described subscribeand-publish list. A subscribe and publish list indicates other objects that need to be updated whenever a given event occurs in a given object such as a change is made to its attributes. For example, a book or other product from a given supplier may have a given price. The price may change at some stage. A catalog object belonging to someone else may subscribe to the book so that it is notified of any change in price. The catalog object may for example encompass a number of different suppliers offering the same book but actually show to the enquirer only the currently cheapest source of the book. Such functionality could be kept up to date by such a subscribe-and-publish list.

In an embodiment, the creation or editing of a subscribe-and-publish list is a defined behavior of an object, which can be achieved by certain of the user interactions. For example, the catalog object of the previous example may allow a user to create his own personalized catalog by dragging objects of interest to the catalog object. Any dragged object detected by the personalized catalog is added to the catalog and the catalog automatically subscribes itself to the object to be kept updated.

Furthermore, the objects of the present embodiments provide an improved level of robustness of distributed computing since data and program objects are distributed over numerous hosts, and the failure of one of the hosts only affects objects on that host. The bulk of users are thus able to continue to make use of the bulk of their objects. Thus, for example, the above-described catalog object is able to function even if some of its listed objects are not on line. Even if the above-described desktop object is unable to function, the user is able to access his objects directly or though competing desktop-type objects.

Objects created by the classes in the present invention easily allow the user to aggregate multi-tenancy type websites, in which individual users visit web sites and receive personalized versions of the general website pages. In the present embodiments the object that is created is intrinsically personalized since it contains a user ID. Furthermore the U/I object may take into account the kind of terminal that the user is currently connected with. Thus suitable adaptations may be made if the user is connecting using a mobile telephone or a palmtop kind of device. In each kind of device the user may receive the most suitable data, and combine it with the personalized data of other web sites.

It is noted that the objects of the present embodiments work with conventional web browsers since standard web browsers incorporate drag and drop and other standard desktop interactivity. Thus web computing in accordance with the present embodiments can be provided to individual users without requiring any changes at the user's computer. The objects can also work with other conventional terminal devices, provided that the U/I object is able to support them, and that the object in question can provide an appropriate user interface.

A conceptual description of Internet computing using the above described embodiments is now provided. The embodiments allow a user's desktop to access his and others' personal virtual Internet domains, hereinafter their workspaces. The workspace is defined with the user's identity, hereinafter the user ID. Instead of visiting the domains of many different service providers, as in the conventional or storefront model, the user brings information into his or her own personal virtual Internet domain—his or her workspace. The workspace is the place where the user generates and consumes services, combines them, stores results, manages data and relationships, and stores links to Internet services, in the various ways described in the above embodiments. The workspace becomes the user's central control station for the Internet. It is completely virtual—there is no workspace provider—no one place, no one host, that the workspace represents, instead the workspace is wholly constructed from diverse services, each one provided separately from a different source. The workspace paradigm may support a user interface similar to a personal computer's windows interface, as has been described in the above embodiments, that is the workspace supports the provision of a user interface with icons which represent objects, and the usual interface operations of a graphical user interface (GUI) are provided such as click, double-click, drag, drop, cut, and paste. However, whereas a windows icon represents an object on the local computer, a workspace icon represents a remote object, the object itself being implemented by any networked host anywhere in the world. Nevertheless, each object is virtually located in a user's workspace, and is owned by a particular user, thus providing a new paradigm—the workspace paradigm—in which the user can understand and work with multiple entities via the Internet, in a way similar to the way he works with multiple programs on a personal computer.

The workspace architecture may be designed to make use of existing Web Services standards, such as: SOAP (Simple Object Access Protocol, http://www.w3.org/TR/SOAP), WSDL (Web Services Definition Language, http://www.w3.org/TR/wsdl), and UDDI (Universal Discovery, Description and Integration, http://uddi.org/pubs/uddi-v3.0.1-20031014.htm). The relationship between the workspace paradigm and Web Services can thus be similar to the relationship between the World Wide Web and the Internet. That is to say, a workspace architecture can provide a user interface and a programming paradigm for Web Services. In doing so it additionally enables the creation of a U/I (user interface) and API (application programming interface) paradigm which makes it possible for human users—end users and programmers—to manipulate web services directly. Exemplary features of the workspace architecture are:

Hosts
Workspaces
Objects
Services
Sessions
Directories

The host is the provider of an object. The host defines classes of objects, implements classes and objects, and provides the runtime environment of the objects. Every class, and every object is associated with exactly one host.

The workspace is the consumer, or owner, of an object. There is a one-to-one relationship between a user ID and a workspace. Thus every user ID has exactly one corresponding workspace, and every workspace is associated with exactly one user ID. A user ID and the corresponding workspace, are thus associated via the user ID with an identity, which may be either a person or an entity. A single person or entity may have many user IDs, for example, a person might have one for use in the office: his office identity, and one for home use: his personal identity. An entity may have different user IDs for different applications in an enterprise.

Likewise, from the server or host point of view, every object that any given host maintains is associated with exactly one workspace. Each object "lives" in a particular workspace, although in fact it physically resides, and is implemented by, a particular host. Thus an object holds both a host identity and a user identity. Every workspace has at least one root host. From the user's point of view, the root host is the identity provider. The root host is responsible for maintaining the user's identity. The root host identifies and authenticates the user, and is responsible for maintaining a relationship with the user in which the actual person or entity can be tracked down, if necessary.

Objects have methods, events, attributes and links. Object access may be provided using Web Services, in which case it can be said that an object encapsulates a web service, where it provides methods and events using the SOAP standard, as described by a WSDL document, or by a fragment of a WSDL document. In addition to user-defined methods, objects according to the present embodiments provide several methods that are common to every object embodying the present invention. The common methods are implemented directly by a server supporting such objects. Among the methods held in common are methods for creating, modifying, and deleting objects and links, accessing attributes of objects, and searching for objects by their attributes. All objects are associated with a specific host, their data described, and methods implemented by classes, as defined by the same host. Each class explicitly implements zero or more services, and implicitly implements a native service of the embodiment. The term "service" refers to a set of methods, events, attributes, and links, which can be implemented by a class. The purpose of such services is to provide a standard interface description that can be implemented by many different classes on many different hosts, so that, for example, a "music" object on one host looks exactly like a "music" object on a different host, in practice meaning that the two objects share the same design of interface.

A session can be roughly thought of as a task. When a user logs in he is assigned a session. New sessions can be created for him if when he wants to perform more than one task simultaneously. The session ensures that if the same user accesses the same object twice at the same time, in the course of two different tasks, that the object does not become confused. The sessions assigned as described herein do not correspond to a browser session, which is usually common to all tasks of a given computer, and does typically confuse web sites if the user tries to do two things at once on the same site.

When associated with a window, the session can be identified by a session ID. When an object access results in the accessed object accessing another object in turn, the session information is passed as part of the accessing message, including the original user ID, and the host IDs, user IDs and object IDs of all other intermediary objects. The receiving object can use the session information for security purposes. The system architecture of the present embodiments preferably incorporates several directories, each directory containing different kinds of information, and each directory can be used to support searching. Directories may themselves be implemented by objects. Some directories are:

- An Identity directory—which provides a lookup facility for entities by user ID, by name, or by other details.
- A Host Directory—provides a lookup facility for hosts by host ID, by name, by IP address, or by other details. The Host Directory can also be used to look up the IP address of a particular host. This information is necessary when sending a message over the Internet to an object on a particular host.
- A Service Directory—provides a lookup facility for services by service ID, by name, or by other details. If messages are implemented through Web Services, the Service Directory may also provide lookup capabilities for Services via UDDI.
- A Class Directory—provides a lookup facility for classes by class IDs, by the service IDs of services that the classes implement, by name, or by other details. The Class Directory can also be used to look up the services that are implemented by a particular class. A class directory could be used, for example, by a user looking for a particular kind of object such as a word processor or a spreadsheet, or for a host which can support such-an object.

All user IDs are preferably registered in the identity Directory. All hosts are preferably registered in the Host directory. User IDs and host IDs must be registered in order to guarantee security. Services and classes may or may not be registered. They are registered for the sole purpose of publicizing themselves. The system architecture is preferably configured to permit local directories in addition to the central directories.

The following are goals of the system architecture:

The system is preferably capable of supporting any number of user IDs;

The system is preferably capable of supporting any number of workspaces, hosts, objects, classes, and services;

The system is preferably capable of supporting many types of terminal devices simultaneously, e.g. Web browser, mobile telephone, and Personal Digital Assistants;

There is no perceptible difference between inter-workspace interactions and intra-workspace interactions;

Any user can interact with any object on any workspace, if he has been granted access rights to do so;

Any user can link to any object on any other workspace, if he has been granted access rights to do so;

Any object can interact with any other object on any workspace, if it has been granted access rights to do so;

The system preferably provides a secure environment in which users can be identified with relatively high certainty;

The system preferably permits the provision of search infrastructure on object attributes or by keywords;

The system preferably requires no installation of classes or services by the user or in the workspace in order to create objects that work according to the present embodiments;

The workspace owner preferably has complete control of all activity in his or her workspace; and The workspace or identity owner can preferably view the history of all activity in his or her workspace.

As will be apparent from the above, an aim of the present architecture is to give users desktop-like functionality in the Internet environment, that is standard desktop or icon-based functionality is available even where different objects with which a user interacts are remote from the user and from each other. However, since the platform is the Internet rather than a personal computer, additional functionality is possible. For example, users do not have to install applications as they do on their personal computer, they simply use an object already created by the service provider, or ask the service provider to create a new object in their workspace. Object providers create objects for their clients (users) on their own servers, however the present embodiments provide the user with the ability to manipulate all of his objects, from diverse providers, on distributed servers, as if they were located in one place, via the above-described desktop object, or similar object.

Secondary issues also preferably addressed by the present architecture include how to maintain security in such an environment, how to find IDs and corresponding entities, services, and other items that interest the user, and how to support multiple user interfaces.

Login

Logins are used both by people and by applications when they want to access their own workspace. All logins are to a particular workspace and host. It is assumed that a particular user ID corresponds to the identity of a particular person or entity.

A login must be identified and authenticated, for example by a username and a password. When the user is authenticated, a session is created for the user. If the user is an application, then login can be via an object in the application's native language, and the session can likewise be an object in the application's native language. If the user is a person working with a browser, the session can be identified by a session id that appears in the query string or path of the URL, or by a cookie, or by any other suitable method.

U/I Object

The U/I or user interface object, 17 in FIG. 2, is responsible for all communication into the system of the present embodiments, from external sources such as user interface terminal devices. The user interface object is responsible for converting information from the external source into a workspace message. In the case of the browser, it typically converts the HTTP query string into a workspace XML message, adding session, identity, security, and other information, and then sends the message to the session's current object, for example the desktop object. If external sources communicate directly with workspace objects, which the system designer may choose to allow, they forfeit this additional information, and bear responsibility for providing the message in the workspace format.

Host and Workspace IDs

Hosts and workspaces are identified by IDs, which are unique worldwide. They may or may not be from the same ID pool.

Classes

Classes are tightly bound to a particular host. They are identified by two-part ids, consisting of the host id and the class id. For the purpose of receiving messages, all classes have the same workspace ID. The host id is unique worldwide, while the class id is unique to a particular host. Classes implement zero or more services, see below.

Services

Services define the interface of a class of objects. They are identified by two-part IDs in the same way as classes, but unlike classes, they are not tightly bound to a particular host. The purpose of services is to define a universal interface that many classes can share, whether or not they are on the same host.

Objects

Objects are instances of a particular class. They are identified by three-part ids, consisting of a workspace or user ID, a host ID, and an object ID. Object IDs are unique to a particular workspace of a particular host. When an object receives a message, the host server can validate the message. If messages are defined using Web Services, the message is validated using the WSDL definitions of the object's services. The message must belong either to the native system service, which every object supports, or to one of the services which the object's class implements, otherwise the message is recognized as an error. If the message belongs to the native system service, it is handled directly by the system server; otherwise the message is passed to the object's implementation, which implements the object's behavior, as defined by the object's class. The object's implementation can be defined in any programming language, typical languages favored in Internet programming being Java, Visual Basic, C, C++, C#, Python, Perl, and PHP.

Links

Objects have zero or more links to other objects. The links consist of the object id of a source object, and the object id of a destination object, the link being from the source to the destination. Links are preferably implemented by the same host that implements the source object. There is of course no guarantee that the destination object of a link has not been deleted, as indeed with the conventional World Wide Web there is no guarantee that a URL target has not been deleted. The destination object does not require any built-in knowledge that it has been linked to.

Messages

In a preferred implementation, messages are XML documents, although any suitable messaging system may be used. The messages may be SOAP documents. If the messages are SOAP documents, the system architecture adds a SOAP header containing additional information, which is used for purposes such as security, sessions, and history. If the messages are not SOAP documents, such header information can be added in an envelope that encloses the XML document.

Attributes

Objects typically have attributes, which may be accessed and modified through native system messages. Object attributes may for example be implemented by SQL tables, say one table for every class on a particular host. Such a table enables efficient SQL searching of objects by their attributes. A system Query message may be implemented to provide native system support for SQL searches of objects. Attributes can also be implemented through other data sources such as XML databases or documents.

Subscribe and Publish

As discussed above with respect to FIG. 8, system objects according to the present embodiments may support subscribe-and-publish, preferably through messages of the native system service. An object subscribes to an event of another object by sending it a subscribe message, and unsubscribes by sending an unsubscribe message. When an event occurs, an object then publishes a message to all current subscribers. The publishing object preferably has complete control of its associated subscription list, and can delete subscribers at will. There is therefore no guarantee to the subscribing object that its subscription will be maintained.

Formulas

Object attributes can be calculated from other attributes using a formula. Creating a formula for an attribute automatically subscribes to the attributes that the formula depends upon.

Transactions

Messages can be transactions—to be carried out either completely or not at all. In addition, there is a special system Transaction message, which is used to send several messages at once as a single transaction. Transactions are essentially interactions between objects.

Authorization

The system server can provide an infrastructure for automatically authorizing object access. Alternatively, an object can implement its own authorization, since the system architecture guarantees identity. As mentioned above, the level of identity guarantee can be varied depending on the kind of object and the kind of security required.

History

The system server records all messages that are received by every object. This can be used to track history, monitor usage, and create reports. In addition, it can be used for forensic security. Methods can be provided for archiving and deleting history records.

Native System Messages

The following table illustrates a possible set of system messages—messages that are common to all system objects. They are defined by the default system service, which all system objects support. It is stressed that the list of messages in the table is purely exemplary.

TABLE 1

Native or Common System Messages

| Name | Description |
| --- | --- |
| AddAcct | Adds a workspace to a host |
| AddCls | Adds a class to a host |
| AddLink | Adds a link to an object |
| AddObj | Adds an object to a workspace and host |
| AddObjFormula | Adds a formula to an object |
| Calculate | Calculates an object attribute using its formula |
| DeleteLink | Deletes a link from an object |
| DeleteObj | Deletes an object from a workspace and host |
| DeleteObjFormula | Deletes a formula from an object |
| Dispatch | Dispatches a message to another object |
| GetAcct | Gets the details of a workspace on a particular host |
| GetCls | Gets the details of a class |
| GetHost | Gets the details of a host |
| GetLinks | Gets the links of an object |
| GetObj | Gets the details of an object |
| GetObjAttr | Gets the value of an object attribute |
| GetObjFormulas | Gets the formulas of an object |
| GetObjHistory | Gets the history of an object |
| GetSubscribers | Gets the subscribers of an object |
| GetUI | Gets the user interface of an object for a specific device |
| ModifyObj | Modifies an object |
| ModifyObjFormula | Modifies a formula of an object |
| Publish | Publish a message to an object's subscribers |
| Query | Gets a list of objects based on an SQL query of its attributes |
| Subscribe | Subscribes one object to an event of another object |
| Transaction | Creates a transaction of more than one message |
| UnSubscribe | Unsubscribes one object from an event of another object |

Every object preferably appears simultaneously on a host and in a workspace. The host is the provider of the object. The workspace is the owner of the object, the workspace's identity indicated by the object's user ID. Hosts correspond to actual servers running on actual computers. User workspaces are virtual.

When one object sends a message to another in the same workspace, in practice the actual communication is likely to be from one host to another. If in FIG. 4, object 26 sends a message to object 21, both of which are in the workspace owned by the user at terminal 10 (the workspace's user ID is the user ID of the user at terminal 10), the message is actually sent from Host 22 to Host 14.

Thus in FIG. 5A, if terminal 10 has a browser 20 that displays a web page produced by a desktop object 21, which displays the objects of the user's workspace as icons, then when the user drags the icon representing object 26 and drops it onto the icon representing object 26', the desktop object informs their corresponding objects by sending a "drag" message, and a "drop" message respectively. The "drag" message tells object 26 that it was dragged to object 26'. The "drop" message tells object 26' that it was dropped on by object 26. The two objects then initiate the behaviors corresponding to the drag or drop respectively, and exchange between them any information that they need to carry on the interaction.

Applications

The embodiments of the present invention as described hereinabove can be applied to the various specific applications of network computing. Examples include the following:

Email

Using conventional email, when a document is sent, it is copied from the sender's computer to the sender's outgoing mail server, which sends it to the recipient's incoming mail server. The recipient then copies it to his or her computer. There are several problems with this system. First, when there are multiple email recipients, multiple copies of the document are made on the network—one for each recipient. If there are many recipients using the same mail server (a typical scenario for intra-corporate email) you will even get multiple copies of the same email on the same email server! Second, the document uses memory on the recipient's mail server and personal computer. If the document is very large, it can create a problem for the recipient, filling the mailbox or precipitating download problems. Third, email is notoriously prone to spam (unsolicited, unwanted email). The main problem enabling spam is that email is not inherently traceable to its sender—it depends on the sender to specify the correct return address.

The application of the present embodiments to e-mail provides an e-mail system that solves all of these problems. Using the present embodiments, an Email Application Object may be used to create Email Document Objects on a server, in the sender's workspace. The document has the sender's user ID. The Email Application Object then sends the recipient a short message with a notification about the email's existence, and where it is located. The recipient can then view or download the document directly from its source. The email document is never actually copied! By not sending the document itself, bandwidth and memory utilization are reduced, and the recipient is not coerced into expending memory resources to receive email which might be unwanted. Furthermore, the user ID forces email senders to reveal themselves, or at least the host they are using to support the document object. The application is useful in the drive against spam since the spam mail never gets sent and is only opened after the recipient has had a chance to consider the notification. Part of what makes the mail traceable is the use in the present embodiments of the session, discussed above in respect of FIG. 3, which relates messages to an originating message from a user client. However, more fundamentally, the recipient is unable even to locate the email without a host ID and a user ID, which reveal the identity of the host and sender respectively.

File Sharing

The present embodiments can be used to support sharing of documents in a fashion which is controlled by the user. Since all workspaces are visible to all users, so that other users can be given access rights, a user can upload a file to an object, set the access rights of the object, and both the file and the object are automatically made available to any other user who is given access rights.

Ad-hoc Application Integration

There is currently a lot of interest in providing applications over the Internet as a service, where previously they were provided as software to be installed on the buyer's computer systems. A big problem with application services is integration. As an example, let's suppose that a firm is using a customer relationship management (CRM) service provided by one vendor, and a human resource management (HRM) service provided by another. Now let's suppose that the firm has a business rule which says that when a salesman is fired, his customers must be assigned to another salesman. The salesman is fired in the HRM service, but his customers get reassigned only when he's fired in the CRM service. How does the CRM service know that the salesman has been fired in the HRM service?

There are two answers available with the current art and neither is especially effective. One solution is to require the HRM and CRM providers to integrate their services directly, and the second solution is to require each provider to supply an interface which enables the user firm to integrate the two services using its own computer systems. The problem with the first solution is that it limits purchasing choice to providers who have integrated with each other or are prepared to work with each other on integration. The problem with the second solution is that it requires the firm to develop and maintain its own bridging software to bridge between the two interfaces.

The present embodiments provide an answer which suffers from neither of the above problems. With the present embodiments the user is enabled to drag a CRM object to an HRM object to say, "this is what I want to do when a salesman is fired". The CRM object would be provided to ask the question, "What do you want to do when a salesman is fired?". The HRM object would be provided to initiate the action, "Fire a salesman". The user knows the meanings of each object because the user interface of each system tells him what they are. For example, the HRM application would naturally provide a way to classify employees as lawyers, dishwashers, salesmen, etc. Next to each category could be an object with the following label, "Drag onto this object all actions to be performed when an employee of this type is fired." The CRM application, knowing that a salesman might be fired as a result of an external event, could provide an object with a simple message, such as "drop", to be used by third party applications for interface purposes, which initiates the firing of a salesman. Its user interface could have a list of actions such as "hire salesman", "fire salesman", "assign customer to salesman", etc. with a object next to each action with the label, "drag to object which will initiate the event". When a salesman is fired in the HRM application, a "drop" message is sent to all objects which were previously dropped on the CRM object. The two applications have been integrated with no explicit integration by either application service provider, and no programming development by the firm using the services.

Weblogs

Weblogs (blogs) are becoming increasingly popular as a means of informal communication over the Internet. One of the attractive features of weblogs is their ability to facilitate a kind of conversation, where an entry in one weblog responds to an entry in another weblog. An entry simply provides a link to another entry and comments on it. Some weblogs provide a "talkback" feature where users can add comments to a weblog entry. Neither of these strategies are completely satisfactory. In the first strategy, the response appears in a different weblog, and while the user can easily go from the response to the original entry, there is no way to go from an entry to its responses. In the second strategy, you can easily go from the original entry to a response, but the response is part of the original weblog—it is not part of the respondent's weblog.

The present embodiments provide a way to easily combine these two strategies—each weblog entry is an object and the response of one user to an entry by another simultaneously becomes part of both weblogs by means of links. The respondent creates an entry in his or her own weblog with the response, providing a link to the original entry, and in addition sends a message to the original weblog entry with information that enables the original entry to link back to it.

It should be noted that the present embodiments' capabilities provide numerous other ways to view weblog entries. For example, entries can be searched and viewed by subject matter, or linked to form a single unified conversation, etc.

Distributed Auctions

Internet auctions are one of the most successful on-line businesses made possible by the World Wide Web. When a person wants to sell something through an Internet auction, he or she puts information on an auction web site describing the thing to be sold. A potential buyer can then search the website for things that he or she wants to buy. The problem with this system is that a potential buyer can only search one web site at a time. The seller, therefore, must pay a premium to put things on web sites that are popular with potential buyers.

Using the present embodiments, the most natural way to implement on-line auctions is for end users to create auction item objects in their own workspaces. It is then easy for an Auction Application Object to query the Class Directory for the classes which implement auction item services, and search the class's hosts (classes are unique per host) for items of interest. A potential buyer, instead of searching a particular web site, uses an Auction Application Object to search the entire Internet for things he or she wants to buy, and thus an auction can be conducted over the web without the need for a centralized auction site.

Collaborative Computing

Collaborative Computing refers to the use of a single document or application by more than one person simultaneously. Collaborative computing products today are based on replicating documents or applications, and synchronizing systems when actions are taken. The same document or application is replicated for each user, and if synchronization is required then a layer of functionality has to be added for keeping all copies synchronized. Synchronization is a difficult task in that it is poorly defined. Thus, when two or more actions occur simultaneously it is often very hard to know how to synchronize them. Sometimes there is no good answer. Moreover, all synchronization systems are prone to loss of synchronization, which can easily lead to loss of data.

Using the present embodiments, it is very easy to provide collaborative computing. For documents, collaborative computing occurs automatically, since numerous people are or can be enabled to access the same item in a controlled fashion that the owner of the object is able to define, as with file sharing above—the different users are in fact viewing and updating the same file, therefore updates can be managed without synchronizing, as they are done in a database. For applications, the application itself would define its behavior in a multi-user context explicitly—no synchronization is necessary because no replication is made. All users access the same copy of the application. In summary, with the present embodiments, collaborative computing can be implemented by enabling many people to use the same object directly, rather than replicating and synchronizing.

Active On-Line Spreadsheet

Using the present embodiments, it is easy to write an active on-line spreadsheet, where cells of the spreadsheet can contain data imported from any object. The advantage of this is that when the imported data changes the entire spreadsheet is recalculated in real time. Actions can then be attached to cell values, for example to buy a stock when its price goes below a certain point.

Mobile Business Card/Contact Manager

Imagine the following scenario: Two strangers meet. The first asks the second for his phone number, and types it into his mobile telephone. Immediately, the first's business card appears on the second's telephone—he can then respond by sending his own business card. When they get home, they can view the same business card on their personal computers that they previously viewed on their mobile telephones, and enter it automatically into their contact manager.

Such a scenario is made possible by the present embodiments in which a behavior can be defined to send business cards upon receipt of contact data such as a mobile telephone number or e-mail address. A single object can support multiple user interfaces, for example a browser and a mobile telephone, as explained hereinabove, and thus can select a format for the business card which is suitable for the device with which it is communicating. Moreover, since all objects can send messages to all other objects, each person's Mobile Business Card/Contact Manager Object can communicate with the other.

Finite Element Analysis

One characteristic of finite element analysis, as well as many other tasks, is that it can be divided into many independent subtasks which can be aggregated for a total analysis. Very large problems such as weather forecasting or modeling of thermal and fluid systems can be solved using finite element analysis, but the numerous elements are hard to manage. Using the present embodiments, numerous objects embody each element in the analysis, and may be located on many different servers but are still able to work simultaneously on the same task. All of the elements can be easily managed because they are all part of the same virtual workspace and know themselves who they are supposed to communicate with. The end user has a system which appears to be running on his personal computer, but actually uses the computing power of many distributed servers.

It is expected that during the life of this patent many relevant network enabled devices and systems will be developed and the scope of the terms herein, particularly of the terms "browser" "message format" and "end-user device", is intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any, suitable subcombination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A networked computing system for facilitating independent remote access by a remote entity to data on a first hosting server and from said data on said first hosting server to data on a second hosting server, said system comprising:
   a plurality of remote terminal devices; and
   a plurality of hosting servers, each one of said plurality of hosting servers being associated with a respective unique host identity, said plurality of hosting servers operative for storing data for remote access in respective software objects hosted thereon, said hosted software objects respectively comprising:
      enablement data,
      a first identity arrangement holding said unique host identity indicating one of said plurality of hosting servers or provider of said object, and
      a second identity arrangement holding respective second unique identities of specific remote entities establishing a relationship with said hosted object via a network through respective remote terminal devices,
   wherein said first and said second identity arrangements, being contained within said hosted software objects and comprising said respective unique identities, enable a plurality of remote entities to access said enablement data of a first of said hosted software objects simultaneously, said respective host and second identity arrangements being preserved with said access such that manipulations of said software object by any one of said remote entities is independent of manipulation of said remote object by any other remote entities, and wherein each respective second, relationship, identity is transferrable with correspondingly independently manipulated data to another one of said hosting servers for a second manipulation with a further software object at said another hosting server, said second manipulation preserving said second, relationship, identity, thereby allowing said respective remote entity to retain a relationship with said further software object after manipulation thereof through said first software object.

2. The system of claim 1, wherein each one of said hosted software objects has been uniquely created upon a message associated with at least one of said specific remote entities.

3. The system of claim 1, wherein said plurality of hosting servers is configured for storing objects that hold in common at least one of said first and said second unique identity.

4. The system of claim 1, wherein each of said objects consists of an object identity, said object identity being selected such that a combination, for said object, of said first identity, said second identity and said object identity is unique within said system.

5. The system of claim 1, wherein at least one of said objects is described by a class which is local to one of said plurality of hosting servers on which said at least one object resides.

6. The system of claim 5, wherein said class supports at least one service of a plurality of services, said services comprising object definitions, and being global to the whole system.

7. The system of claim 1, comprising authentication hosting module operative for respective remote users, such that each remote user has an assigned authentication host for said system.

8. The networked computing system of claim 1, wherein said enablement data further comprises at least one of a link, attributes, a class identity and behavior.

9. The networked computing system of claim 8, wherein said enablement data further comprises at least one attribute being configured to store representational information, said predetermined object behaviors allow altering of said at least one attribute.

10. The networked computing system of claim 1, wherein said remote terminal device further comprising a user interface via which remote entity is able to carry out interactions therewith.

11. The networked computing system of claim 10, wherein said user interface is configurable to permit interactions with other objects stored on said plurality of hosting servers.

12. The networked computing system of claim 1, wherein at least one of said objects is configured as an interface object to communicate between said remote entity, through said remote terminal device, and another object, said interface object comprising:
a translating software module for translating messages between an external messaging protocol and an internal system protocol, and
a communication software module for relaying messages between said remote entity, through said remote terminal device, and said another, via said translating unit.

13. The networked computing system of claim 12, wherein said translating unit is operable to relay messages between a plurality of other objects and said remote entity through said remote terminal device.

14. The networked computing system of claim 12, comprising selectable interface functionality, each suitable for a different remote terminal device.

15. The networked computing system of claim 12, configured to generate messages in response to user interactions at said remote device and to send said messages to said another object.

16. The networked computing system of claim 15, wherein said user interactions comprise associations with other objects, said associations being made at said remote terminal device.

17. The networked computing system of claim 16, configured such that said interactions at said remote terminal device generate commands that include identification data of a respective one of said other objects.

18. The networked computing system of claim 15, wherein said messages comprise one of HTTP messages, XML messages, SOAP messages and WSML messages.

19. The networked computing system of claim 15, wherein said messages are specific responses to any one of a group of computer-user interaction consist at least one of the following user interaction: a key press, a mouse click, a mouse drag, a mouse select, a mouse drag and drop, a cut action, a copy action, a paste action, a launch action, an undo action, a redo action, a repeat action, and a delete action.

20. The networked computing system of claim 12, further comprising a desktop object software module located between said interfacing object and said first hosted software object, said desktop object being configured to represent said at least one object as a desktop icon at said remote entity and to provide desktop icon functionality of said hosted software object to said remote entity.

21. The networked computing system of claim 1, wherein said object further comprises:
a list, associated with a data item or event, comprising at least one object that has indicated a need to be updated regarding said data item or event, and
a publish module associated with said list for sending messages regarding a data item or event to said at least one object.

22. The networked computing system of claim 21, wherein said publish module is programmable, to allow a user through said remote terminal device to alter said list.

23. The networked computing system of claim 22, further comprising a plurality of data items or events, and wherein said publish module is configured to provide separate lists for different ones of said data items or events.

24. The networked computing system of claim 1, further comprising an object ID, which, together with said first and said second identities, provides a unique identity thereto.

25. The networked computing system of claim 1, wherein said remote terminal devices are adapted to simultaneously access a plurality of said hosted software objects which are hosted on respective ones of said hosting servers.

26. A hosting server for providing computing services via a network to a plurality of remote users, the hosting server being associated with a first unique identity, said hosting server comprising:
a network interface for interaction with remote users over said network;
at least one first hosted software object;
at least one interfacing software object adjusted to facilitate independent access of each of said remote users simultaneously to said first software object, said first software object and said interfacing software object each comprising:
enablement data within a respective software object,
a first identity arrangement within a respective sofware object, holding said first unique identity indicating a host or provider of said object, and
a second identity arrangement within a respective software object, holding a second unique identity of any one of said remote entities currently establishing a relationship with said object via a network,
said interfacing object being able to exclusively send user interface messaging to a respective remote user via said network, and to interpret user interactions of said respective remote user independently of interactions made by others of said remote entities for messaging to one other further remotely located unique software object, said messaging comprising both said first unique identity and said second unique identity, thereby to allow said remote user to independently and identifiably access said other further unique software object from said first hosted software object.

27. A method for providing a plurality of remote devices with the ability to access the same data over a plurality of hosting servers independently, such that one of said remote devices is enabled to bring about independent interactions between data on different ones of said hosting servers, the method comprising:
a) providing access for a plurality of remote terminal devices;
b) providing a plurality of hosting servers each being associated with a respective host identity, each of said plurality of hosting servers operative for storing at least one hosted software object;
c) packaging into said hosted software object:
enablement data,
a first identity arrangement in said hosted software object, holding said host identity indicating a respective hosting server or provider of said object, and
a second identity arrangement, in said hosted software object, holding a second identity of a specific remote entity establishing a relationship with said object via a network through said remote terminal device; and d) receiving a request from a respective remote entity over a network, the request relating to said hosted software object, the request being received through said remote terminal device, the request setting said second identity to identify said respective remote entity, thereby establishing a relationship between said remote entity and said object, while retaining said first identity, e) receiving a request from said respective remote device for said hosted software object to interact with a further software object at another of said plurality of hosting servers, said hosted software object responding to said interaction request by sending interaction messaging to said further software object, said interaction messaging including said host identity and said second identity, thereby to identify any interaction carried out at said further software object in consequence of said interaction request as being associated with said respective remote user, thereby enabling said respective remote user to bring about uniquely identified interactions between data on different ones of said hosting servers.

28. The method of claim 27, further comprising:

creating an interface object, said interface object being responsive at least to standard user interaction events, and receiving said interaction messaging through said remote terminal device from said remote entity at said interface object and using said interaction messaging to activate at least one behavior at said further software object.

29. The method of claim 27, comprising using said second identity for personalization of said object for said remote entity using said remote terminal device.

30. The method of claim 29, comprising using respective second identities to define an aggregation of personalized objects as a workspace environment for said remote entity.

31. The method of claim 27, further comprising a step between said step c) and said step d) of packaging into said hosted software object a third identity, which, together with said first identity and said second identity, provides a unique identity thereto.

* * * * *